May 29, 1934.   E. ANDERSON   1,960,429
APPARATUS FOR MOLDING GRINDING WHEELS
Filed Jan. 15, 1927
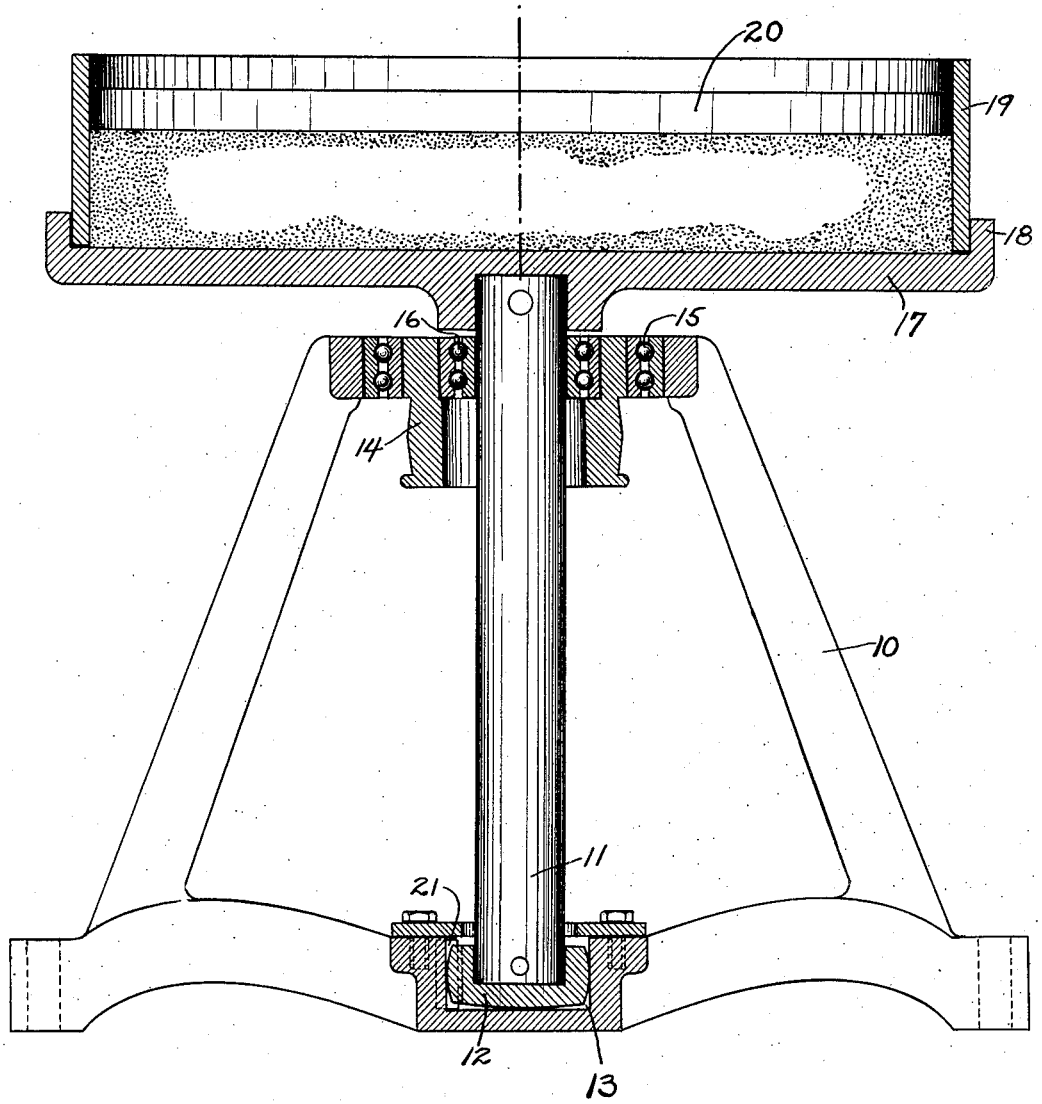

Patented May 29, 1934

1,960,429

UNITED STATES PATENT OFFICE 1,960,429

APPARATUS FOR MOLDING GRINDING WHEELS

Edward Anderson, Dayton, Ohio, assignor, by mesne assignments, to Simonds Worden White Company, a corporation of Ohio Application January 15, 1927, Serial No. 161,444

5 Claims. (Cl. 25—41.1)

This invention relates to the ceramic art, and more particularly to a method of and apparatus for molding ceramic articles, especially grinding wheels.

One well known method of molding grinding wheels consists in thoroughly mixing the abrasive material, which is to constitute the major element of the wheel, with clay or other materials for binding the abrasive material together, while these materials are in a dry state. A small quantity of water is then added to this mixture, whereby it is rendered cohesive, but not fluid. The material is then placed in a mold, and, in the most commonly used method, it is compacted by heavy pressure. This is known as the "dry pressing" method of molding wheels. The method produces a very dense body, but it is found difficult to produce wheel of uniform density by this method. The object of my present invention is to overcome this difficulty, and provide a method whereby the density of the mass is made uniform. One manifestation of lack of uniformity in the density of a grinding wheel is its lack of balance. To overcome this it has been necessary to balance wheels made by the well known dry pressing method. It is not only costly to balance the wheels, but at best it is only a partial remedy for the trouble. Lack of uniformity in density results in un-uniform wear of the wheel, with consequent difficulty of keeping the wheels true. All of this difficulty is overcome by the use of my new method. I shall now proceed to describe my method, also apparatus for practicing the method, and in this description I shall refer to the accompanying drawing, which is a vertical sectional view of my apparatus, showing a mass of material in the mold.

In a frame 10, I mount a shaft 11 in an upright position. Secured to the lower end of the shaft is a circular shoe 12, which shoe sets in a socket 13 in the lower part of the frame 10. In a word, the lower end of the shaft is attached to the frame by a sort of universal joint. For my purposes, however, I prefer to refer to it as a "wabble" joint. At the top of the frame 10, a pulley 14 is mounted to rotate in the frame on a vertical axis. Preferably the pulley is mounted in the frame by a ball bearing 15. The shaft 11 extends up thru the pulley, to which it is connected by a ball bearing 16. This bearing is placed slightly to one side of the center of the pulley, with the result that when the pulley is rotated the upper end of the shaft moves in a circle of very small diameter. Mounted on and securely attached to the upper end of the shaft, close above the bearing 16, is a circular plate 17. The upper surface of this plate is perpendicular to the axis of the shaft, and flat, save that at this perimeter it has an upwardly extending flange 18. Standing on the plate, and held in place by the flange 18, is a ring 19. The ring and plate form a mold, into which the mass to be molded is put. A vertical dot-and-dash line coincides with that which is to be the axis of rotation of the wheel. Upon the mass is laid a circular cover or weight 20.

By means of a belt on the pulley 14, not shown, and any suitable means for driving the belt, also not shown, the pulley is rotated rapidly. This causes the mold to move in a circle of small diameter, giving the mold a tremulous or vibratory motion, in a direction approximately horizontal. This brings about a uniform distribution of the material in the mold, the action being amplified by the weight of the cover 20, resulting in a very compact mass of uniform density. In order to prevent rotation of the shaft on its own axis I provide a spline 21, which keeps the shoe 12 from rotating in the socket 13. This spline is not essential, however, as the tendency of the pulley to rotate the shaft is but slight, and such tendency would be largely overcome by friction in the wabble joint.

It is not essential that the vibration of the mold be produced by a shaft, the lower end of which is stationary; satisfactory results would be obtained were the mold oscillated in a horizontal plane, as, for example, if the entire shaft moved in a circle instead of its lower end being stationary. I have merely adopted the structure illustrated, because of the simplicity of its construction. Instead of providing the pulley 14 and rotating it with a belt, arrangements might be provided for driving the rotary member with bevel gearing, or in any other of several well known means by which this could be done. Such changes would be so obvious to a skilled mechanic that it is not necessary to illustrate or describe them. I do not desire to limit myself to vibration of any particular amplitude. In the drawing I have placed the axis of the shaft about $\frac{1}{16}$" away from the axis of the pulley, thus causing the mold to move in a circle of approximately $\frac{1}{8}$". Depending upon the velocity at which the pulley is rotated, the amplitude of vibration may be varied. Furthermore, the most desirable amplitude depends some upon the size of the wheel to be molded. The weight of the cover 20 may also be varied to suit various conditions. While I have referred to the preparation of the mass to be molded, it is not to be understood that the employment of my method, or the apparatus described, is limited to a mixture of the character mentioned. These and other variations are within the province of persons skilled in the ceramic art, and having described the object of my invention, and the principle upon which it operates, what I claim as my invention is as follows:

1. Apparatus for molding an abrasive wheel, comprising a vertical shaft, a mold mounted on the upper end thereof, and means for moving the upper end of the shaft rapidly in a very small circle, thereby imparting a tremulous movement to the mold, adapted to compact the material contained in the mold.

2. Apparatus for molding an abrasive wheel, comprising a vertical shaft, a mold mounted on the upper end thereof, a ball and socket bearing for the lower end of the shaft and means for moving the upper end of the shaft in a very small circle, whereby to impart a tremulous movement to the mold.

3. Apparatus for molding an abrasive wheel, comprising a frame, an upright shaft, the lower end of which is secured to said frame by a wabble-joint, a pulley in said frame near the upper end of the shaft, through which the shaft passes, said pulley being attached to the frame by a bearing which allows the pulley to be rotated in the frame by a belt, the shaft being connected to the pulley by a bearing which allows the pulley to rotate with reference to the shaft, the latter bearing being slightly off center in the pulley, and a mold mounted on the upper end of the shaft.

4. Apparatus for molding an abrasive wheel, comprising a frame, an upright shaft, the lower end of which is secured to said frame by a wabble-joint, a pulley in said frame near the upper end of the shaft, through which the shaft passes, said pulley being attached to the frame by a bearing which allows the pulley to be rotated in the frame by a belt, the shaft being connected to the pulley by a bearing which allows the pulley to rotate with reference to the shaft, the latter bearing being slightly off center in the pulley, a mold mounted on the upper end of the shaft, and means for preventing rotation of the shaft on its own axis.

5. Apparatus for molding an abrasive wheel, comprising an upright shaft, a mold mounted on the upper end thereof, a ball and socket bearing for the lower end of said shaft, and a pulley on said shaft; said pulley being mounted to rotate in a bearing to which the belt carrying face is concentric, and connected to the shaft by a bearing which enables the pulley to rotate with reference to the shaft, said bearing being slightly off-center, so that the shaft is moved in a circle of very small diameter when the pulley is rotated, thus imparting a tremulous movement to the mold.

EDWARD ANDERSON.